United States Patent [19]

Oberbreckling

[11] Patent Number: 5,615,984
[45] Date of Patent: Apr. 1, 1997

[54] MACHINING TOOL AND AUTOMATED AIR-BURST CONTROL DEVICE FOR USE WITH A MACHINING TOOL

[76] Inventor: Lester W. Oberbreckling, 7215 Connan La., Charlotte, N.C. 28226

[21] Appl. No.: 508,957

[22] Filed: Jul. 28, 1995

[51] Int. Cl.$^6$ ................................................ B23B 51/06
[52] U.S. Cl. ........................... 409/137; 409/136; 408/56; 408/61
[58] Field of Search ................ 408/56, 61, 67; 409/137, 136

[56] References Cited

U.S. PATENT DOCUMENTS

| | | | |
|---|---|---|---|
| 3,577,808 | 5/1971 | Visser | 408/61 |
| 3,880,047 | 4/1975 | Dosier | 409/137 X |
| 4,573,833 | 3/1986 | Kondo | 409/136 X |
| 4,708,539 | 11/1987 | Threadgill | 408/61 |
| 4,778,315 | 10/1988 | Duffy et al. | 408/61 X |
| 5,190,421 | 3/1993 | Wen et al. | 408/61 X |

*Primary Examiner*—M. Rachuba
*Assistant Examiner*—Henry W. H. Tsai
*Attorney, Agent, or Firm*—W. Thad Adams, III, P.A.

[57] ABSTRACT

An automated air-burst control device is provided for use with a machining tool to clear away fragments of a work piece being machined. The air-burst control device includes an inlet pneumatically communicating with a source of compressed air. A control valve pneumatically communicates with the inlet, and is movable between open flow and closed flow conditions. The control valve is normally disposed in the closed flow condition for blocking air flow from the inlet through the control valve. An actuator is operatively connected to the control valve, and responsive to a triggering event for moving the control valve into its open flow condition to release air flow from the inlet through the control valve. An air flow outlet line pneumatically communicates with the control valve, and has a free end thereof directed towards the work piece being machined. Upon occurrence of the triggering event, the actuator moves the control valve into its open flow condition to direct a burst of air flow from the inlet through the outlet line to the work piece being machined, thereby clearing away fragments of the work piece from the work piece and the machining tool.

14 Claims, 5 Drawing Sheets

MACHINING TOOL AND AUTOMATED AIR-BURST CONTROL DEVICE FOR USE WITH A MACHINING TOOL

TECHNICAL FIELD AND BACKGROUND OF THE INVENTION

This invention relates to a machining tool, and automated air-burst control device for use with a machining tool. The air-burst control device is particularly adapted for retrofit onto existing vertical milling machines, drill presses, tapping machines, CNC machining centers, manual turning lathes, CNC lathes, and the like.

When machining a number of work pieces in succession, such as in assembly line manufacturing, it is important that the resulting cut fragments and chips of the work piece be cleared away from the work piece and the vicinity of the machining tool after each machining operation. For most manually operated machining tools, a hand-held air blower with a trigger mechanism is used for this purpose. The blower is grasped by the worker after each operation, aimed towards the workpiece and machining tool, and then triggered to direct a burst of air into the vicinity of the machining tool cutter and the work piece. This requires interrupted operation of the machining tool for rather lengthy intervals, and relatively precise use of the blower in order to properly clean the work piece and work area.

Given the time pressures generally associated with assembly line manufacturing, a worker may neglect to use the air blower after each cutting, or may use the air blower in an improper or ineffective manner. In some cases, a worker may inadvertently spray the cut fragments and chips outwardly onto an adjacent worker or work area. This creates a potential safety hazard. In other cases, a worker may spray the cut fragments and chips of the work piece downwardly into the internal components of the machining tool, ultimately requiring expensive repairs and parts replacement. In addition, work piece fragments remaining on the machining tool vice and/or cutter after cutting may impact the tolerances of subsequently cut work pieces.

The present invention addresses these and other problems associated with hand-held air blowers by providing an automated air-burst control device which can be retrofitted onto existing machining tools for automatically blowing away cut fragments after each cutting. The invention increases production approximately 100% over manufacturing processes using hand-held blowers. Moreover, the invention consistently directs the blown fragments into a relatively confined area, thus minimizing clean-up, risk of injury to adjacent workers, and damage to equipment.

SUMMARY OF THE INVENTION

Therefore, it is an object of the invention to provide an automated air-burst control device for use with a machining tool.

It is another object of the invention to provide an air-burst control device which effectively clears cut fragments of a work piece being machined away from a work piece and machining tool after each operation without prolonged interruption of the operation of the machining tool.

It is another object of the invention to provide an air-burst control device for a manually operated machining tool which is particularly adapted for machining an indeterminate number of work pieces in succession.

It is another object of the invention to provide an air-burst control device which is easily retrofitted onto an existing machining tool.

It is another object of the invention to provide an air-burst control device which increases the productivity of manually actuated machining tools.

It is another object of the invention to provide an air-burst control device which complies with OSHA safety requirements.

It is another object of the invention to provide an air-burst control device which is relatively inexpensive to manufacture.

It is another object of the invention to provide an air-burst control device which is readily removable from and operable independent of the machining tool.

It is another object of the invention to provide an air-burst control device which reduces the risk of injury resulting from cut fragments being blown away from the work piece and machining tool.

These and other objects of the present invention are achieved in the preferred embodiments disclosed below by providing an automated air-burst control device for use with a machining tool to clear away fragments of a work piece being machined. The air-burst control device includes an inlet pneumatically communicating with a source of compressed air. A control valve pneumatically communicates with the inlet, and is movable between open flow and closed flow conditions. The control valve is normally disposed in the closed flow condition for blocking air flow from the inlet through the control valve. An actuating means is operatively connected to the control valve, and responsive to a triggering event for moving the control valve into its open flow condition to release air flow from the inlet through the control valve.

An air flow outlet line pneumatically communicates with the control valve, and has a free end thereof directed towards the work piece being machined. Thus, upon occurrence of the triggering event, the actuating means moves the control valve into its open flow condition to direct a burst of air flow from the inlet through the outlet line to the work piece being machined, thereby clearing away fragments of the work piece from the work piece and the machining tool.

According to one preferred embodiment of the invention, the actuating means includes a pressure-responsive actuator valve pneumatically communicating with the inlet and the control valve. The actuator valve is opened upon occurrence of the triggering event to direct air flow from the inlet to the control valve to move the control valve from its closed flow condition into its open flow condition.

According to another preferred embodiment of the invention, the actuator means includes first and second pneumatic control lines pneumatically interconnecting the actuator valve with the inlet and the control valve.

According to yet another preferred embodiment of the invention, a flow adjuster is located between the actuator valve and the control valve for adjusting the duration of air flow from the actuator valve to the control valve. The flow adjuster operates to maintain the control valve in its open condition for a predetermined time period, thereby controlling the duration of air flow from the inlet through the outlet line and to the work piece being machined.

According to yet another preferred embodiment of the invention, an air pressure regulator is located at the inlet and pneumatically communicates with the control valve for regulating the flow of air from the inlet through the control valve in its open condition.

According to yet another preferred embodiment of the invention, at least one flexible and adjustable nozzle assembly pneumatically communicates with the free end of the outlet line to direct the outward flow of air from the outlet line towards the work piece being machined.

According to yet another preferred embodiment of the invention, an air manifold is located between the free end of the outlet line and the at least one flexible nozzle assembly for pneumatically interconnecting the outlet line and the at least one flexible nozzle assembly.

According to yet another preferred embodiment of the invention, the at least one flexible nozzle assembly is constructed of a plurality of removable and replaceable interconnecting segments.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
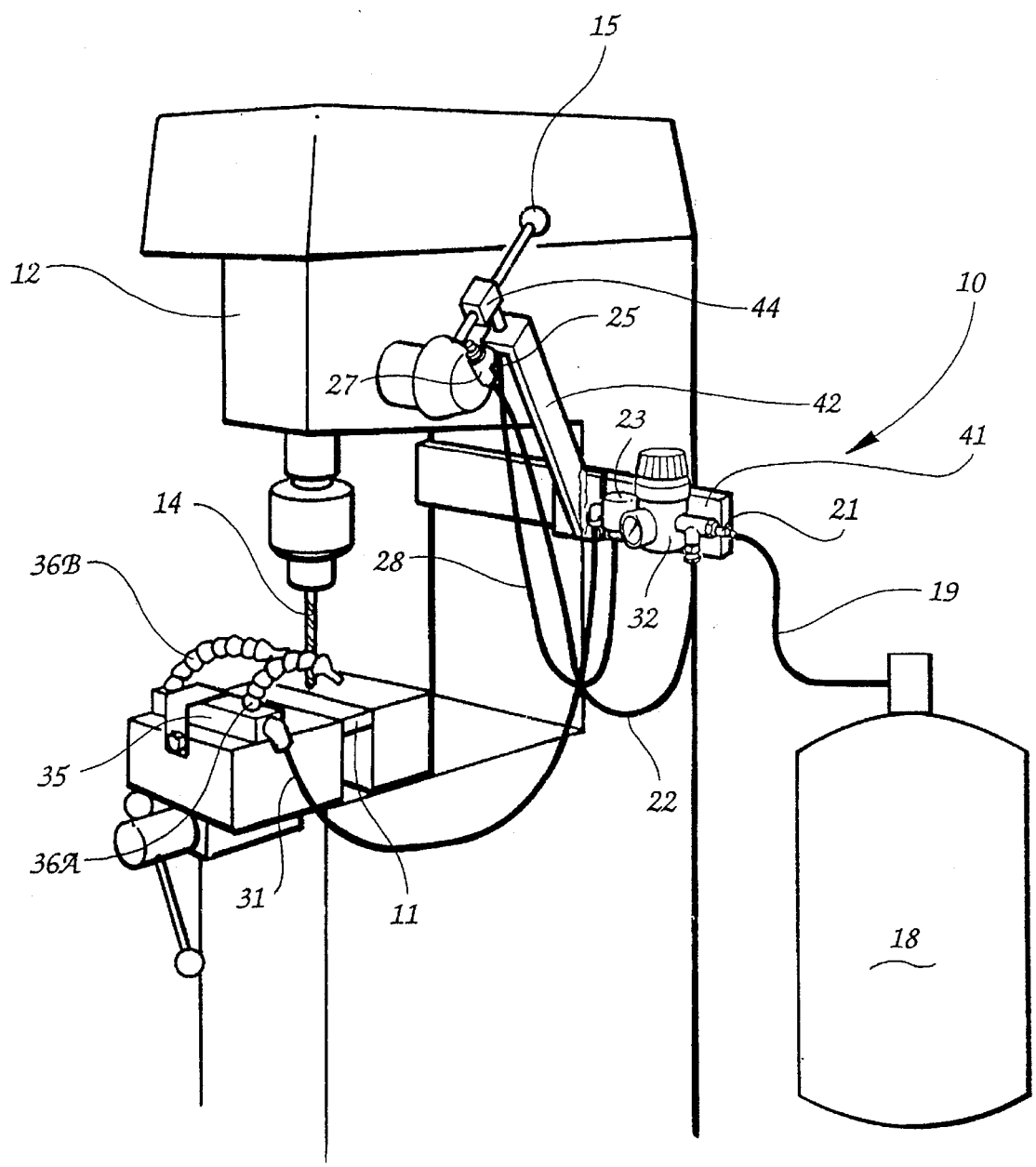
FIG. 1 is an environmental perspective view of a drill-press type milling machine with an automated air-burst control device according to one preferred embodiment of the invention.

Referring now specifically to the drawings, an automated air-burst control device according to the present invention is illustrated in FIG. 1 and shown generally at reference numeral 10. The air-burst control device 10 is usable in combination with a machining tool for clearing away fragments of a work piece 11 being machined. In the embodiment disclosed, the air-burst control device 10 is adapted for attachment to a manually actuated drill-press type vertical milling machine 12, such as that manufactured by Bridgeport, Inc.

The milling machine 12 includes a rotating cutter 14 movable between a raised position away from the work piece 11, and a lowered cutting position engaging the work piece 11. A manual lever arm 15 moves the rotating cutter 14 vertically between the raised and lowered positions. Once the desired cut has been made, the lever arm 15 is returned by the worker to its initial position to raise the rotating cutter 14 away from the work piece 11. The automated air-burst control device 10 is then triggered sending a burst of compressed air to an immediate area of the work piece 11 to clear away cut fragments of the work piece 11 from the work piece 11 and the milling machine 12. The elements and operation of the air-burst control device 10 are described in detail below.

Assembly of the Air-burst Control Device 10

Figure 2:
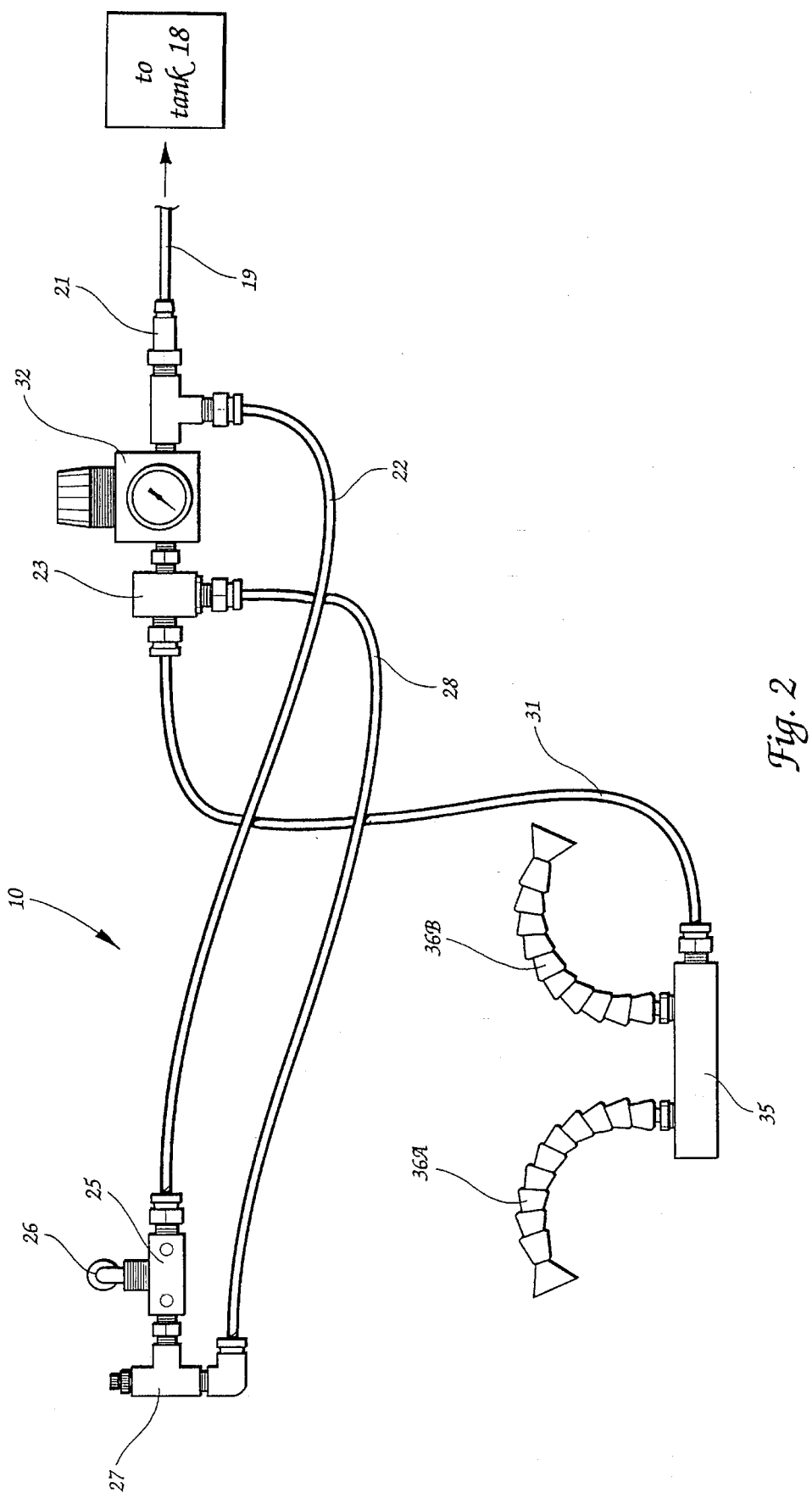
FIG. 2 is an elevational view of the air-burst control device.

As best shown in FIGS. 1 and 2, the air-burst control device 10 utilizes a source of compressed air or other gas preferably stored in a 5–10 gallon sealed tank 18. A pneumatic supply line 19 extends from the tank 18 to an inlet 21 of the air-burst control device 10. The inlet 21 pneumatically communicates with a first control line 22, and a control valve 23.

The control valve 23 is maintained in a normally closed flow condition to block the passage of compressed air received from the inlet 21 through the control valve 23. The control valve 23 is movable into an open flow condition upon occurrence of a triggering event, and is maintained in this condition for a preset duration, as described further below.

When in its closed flow condition, the control valve 23 directs the flow of compressed air from the inlet 21 into the first pneumatic control line 22. The first control line 22 is pneumatically connected to a normally closed actuator valve 25 including a pressure-responsive roller 26 which controls the opening of the actuator valve 25 when engaged. When opened, the actuator valve 25 allows free passage of compressed air from the first pneumatic control line 22 through the actuator valve 25 and into a manually preset flow adjuster 27.

The flow adjuster 27 is connected to a second pneumatic control line 28, and operates to set the duration of air flow received into the second control line 28 through the actuator valve 25. The second control line 28 interconnects the actuator valve 25 and the control valve 23, and permits the flow of compressed air from the flow adjuster 27 to the control valve 23. The resulting dynamic air pressure acting on the control valve 23 moves the control valve 23 from its normally closed flow condition to the open flow condition, and maintains it in the open flow condition for a time period corresponding to the preset duration of air flow governed by the flow adjuster 27. The flow adjuster 27 preferably has a setting range of between one-eighth of a second and eight seconds.

When in the open flow condition, the control valve 23 releases a burst of compressed air from the inlet 21 through the opened control valve 23 and into an outlet line 31 pneumatically connected to the control valve 23. A pressure regulator 32 is preferably located between the inlet 21 and the control valve 23 for governing the air pressure to the control valve 23. In one application, the pressure regulator 32 is set at 30 psi to comply with current OSHA requirements.

An air manifold 35 is preferably connected to the outlet line 31 for directing the burst of compressed air outwardly through adjustable nozzles 36A and 36B. The nozzles 36A and 36B are pneumatically connected to the manifold 35, and serve to confine the air burst to a relatively small area surrounding the work piece 11 being machined. The nozzles 36A and 36B may be constructed of a plurality of removable, interconnecting segments to provide flexibility, and allow quick and easy length or directional adjustment, as desired.

Upon expiration of the preset duration of air flow into the second control line 28, compressed air contained in the second control line 28 is redirected back into the actuator valve 25 and through an exhaust opening (not shown)

formed in the actuator valve 25. Air pressure within the second control line 28 drops. As a result, the control valve 23 automatically returns to its normally closed flow condition blocking the further passage of compressed air from the inlet 21 into the outlet line 31 and through the nozzles 36A and 36B. The compressed air flow is redirected into the first pneumatic control line 22 with the actuator valve 25 closed, as previously described.

According to one preferred embodiment of the air-burst control device, the control valve 23 is a standard pilot valve such as that manufactured by Humphrey, Inc., part no. 250A-21. The actuator valve 25 is a roller cam valve manufactured by Mead, Inc., part No. MV-30. The flow adjuster 27 is an adjuster manufactured by SMC, Inc., part No. AS2200. The pressure regulator 32 is a regulator manufactured by Watts FluidAir, part No. R10-02CP M3. The first and second pneumatic control lines 22 and 28 are one-quarter inch diameter plastic air hoses. The outlet line 31 is a three-eighth inch diameter plastic air hose. The nozzles 36A and 36B are manufactured by Loc Line, Inc.

Operation of the Air-burst Control Device 10

The air-burst control device 10 is located on or adjacent to the milling machine 12 using any suitable mounting structure. As best shown in FIG. 1, the inlet 21, pressure regulator 32, and control valve 23 of the air-burst control device 10 are preferably mounted on an outwardly extending mounting plate 41 attached to the milling machine 12. An extension bar 42 is bolted to the mounting plate 41, and serves to vertically support and position the actuator valve 25 within the path of movement of the lever arm 15. A valve-engaging block 44 is connected to the lever arm 15, and aligned to engage the roller 26 of the actuator valve 25 as the lever arm 15 is moved into an activating position, as described below with reference to FIGS. 3–5. The outlet nozzles 36A and 36B of the air-burst control device 10 are located adjacent to the machine cutter 14, and are manually adjusted to blow cut fragments of the machined work piece 11 into a predefined area.

Figure 3:
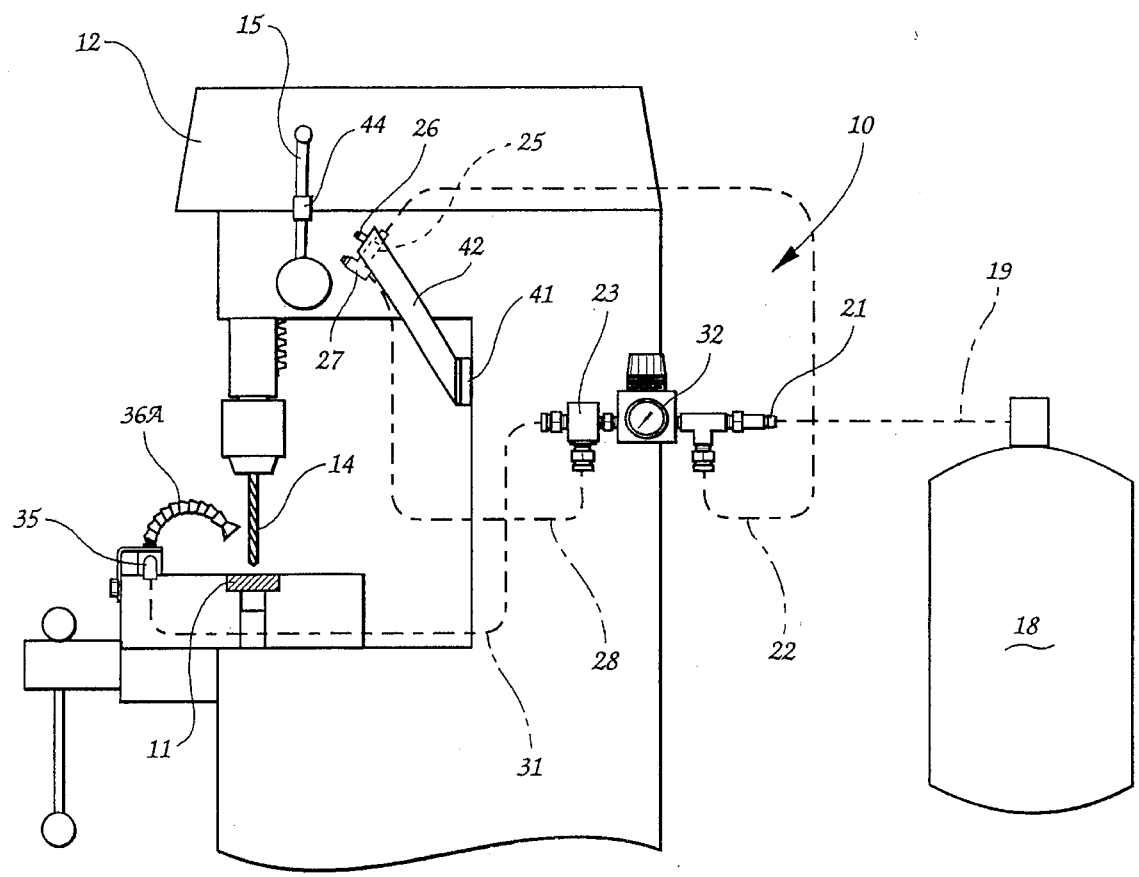
FIG. 3 is a side elevational view of the milling machine and air-burst control device with the rotating cutter of milling machine in a raised position prior to cutting.
Figure 4:
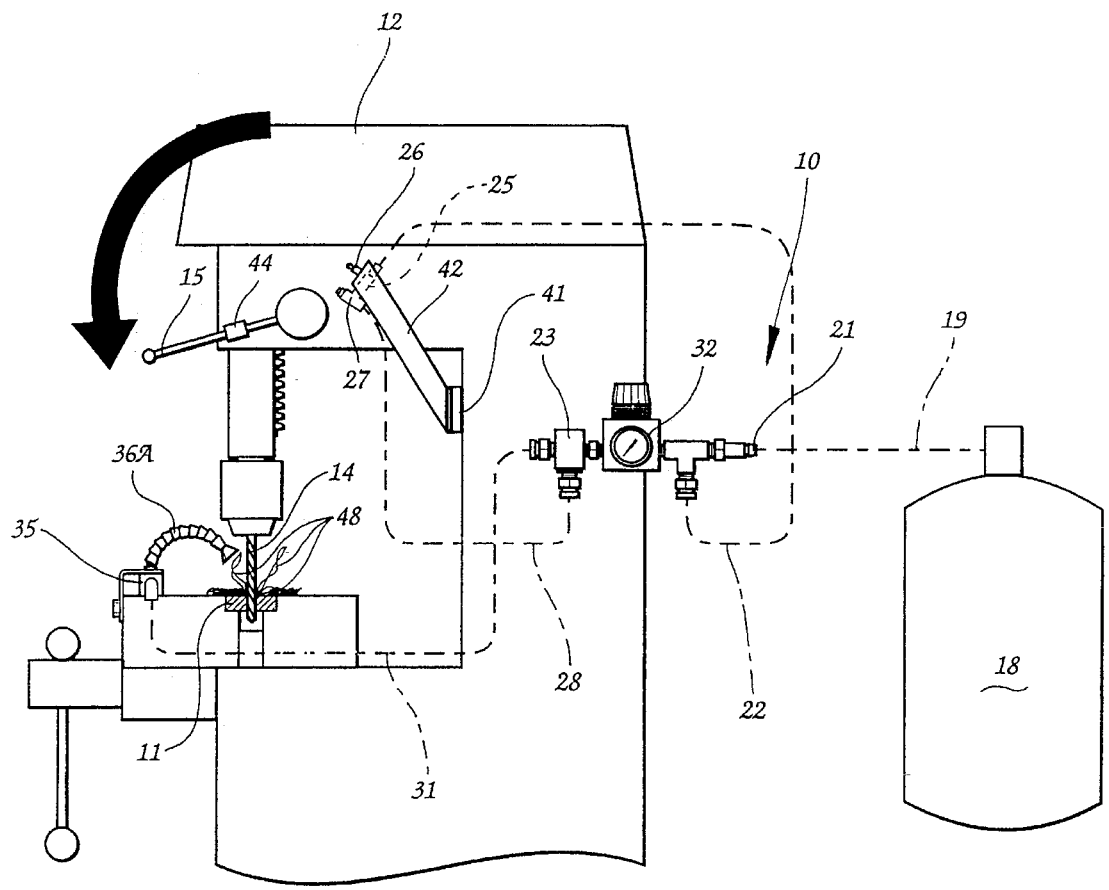
FIG. 4 is a side elevational view of the milling machine and air-burst control device with the rotating cutter of milling machine in a lowered, cutting position.
Figure 5:
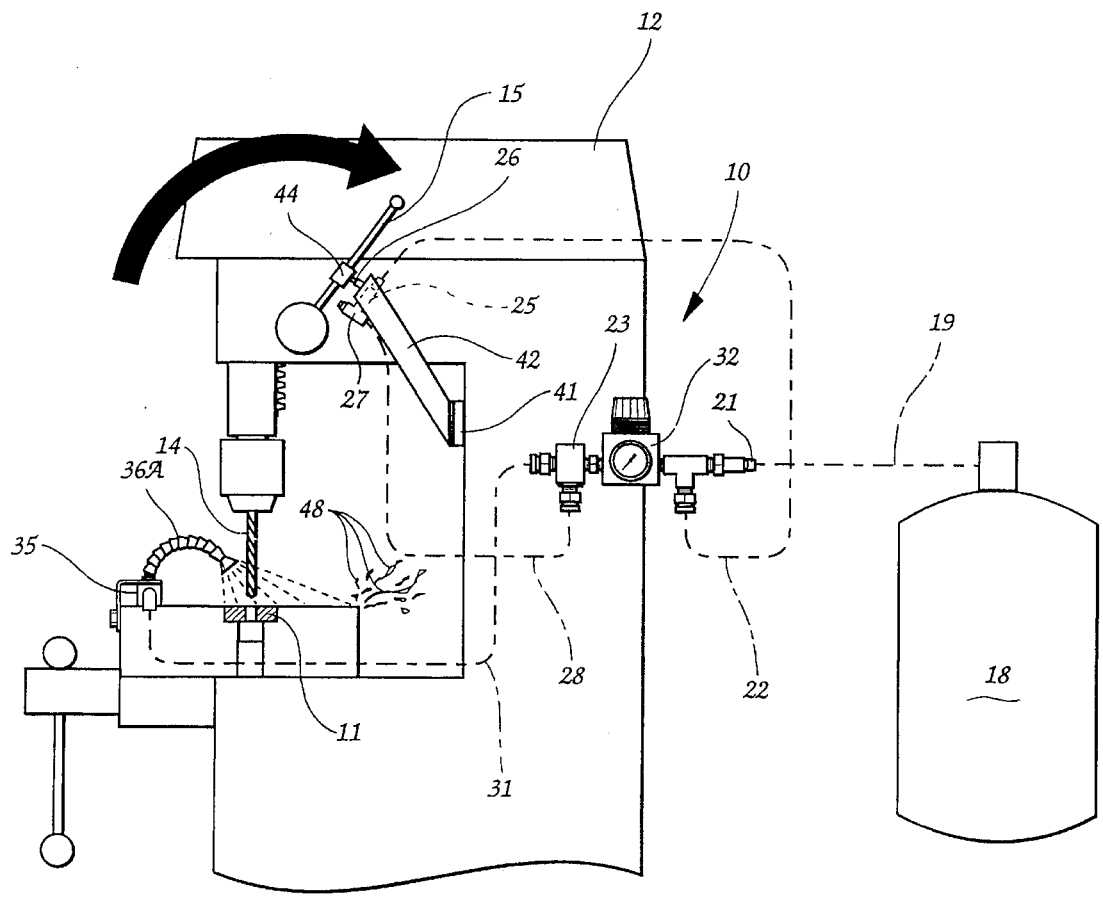
FIG. 5 is a side elevational view of the milling machine and air-burst control device with the rotating cutter of milling machine returned to its raised position after cutting, and showing the lever arm of the milling machine in an activating position for triggering operation of the air-burst control device.

FIG. 3–5 illustrate operation of the air-burst control device 10. As shown in FIG. 3, the work piece 11 is first loaded into the milling machine 12 with the rotating cutter 14 in its raised position. The lever arm 15 of the milling machine 12 is in a generally up position. To initiate cutting, the worker moves the lever arm 15 as indicated by the direction arrow of FIG. 4. The rotating cutter 14 is lowered into its work piece cutting position. During cutting, chips and fragments 48 of the work piece 11 fall onto the surface of the work piece 11 and into the immediate vicinity of the cutter 14.

After the desired cut has been made, the worker moves the lever arm 15 as indicated by the direction arrow of FIG. 5, and the cutter 14 returns to its raised position. Further movement of the lever arm 15 from the generally up position shown in FIG. 3 to an overextended, activating position shown in FIG. 5 causes the valve-engaging block 44 of the lever arm 15 to contact the roller 26 of the actuator valve 25. The resulting impact opens the actuator valve 25, as described above, and triggers activation of the air-burst control device 10. A burst of compressed air is directed from the nozzles 36A and 36B towards the machined work piece 11 to blow away cut fragments 48 of the work piece 11 from the work piece 11 and the cutter 14.

In alternative embodiments, the air-burst control device may include other suitable actuating means for automatically moving the control valve into its open flow condition upon occurrence of a predetermined triggering event. For example, the control valve may be actuated either mechanically, electrically, or by any other pneumatic means not disclosed. In a further embodiment, a computer controls the opening and closing of the control valve. In addition, the air-burst control device is usable in combination with other machining tools, such as drill presses, tapping machines, CNC machining centers, manual turning lathes, CNC lathes, and the like.

An automated air-burst control device for use with a machining tool is described above. Various details of the invention may be changed without departing from its scope. Furthermore, the foregoing description of the preferred embodiment of the invention and the best mode for practicing the invention are provided for the purpose of illustration only and not for the purpose of limitation-the invention being defined by the claims.

I claim:

1. An automated air-burst control device for use with a machining tool comprising a rotating cutter for machining a work piece, and a pivoted lever arm for being actuated to move the cutter between an operative position wherein the cutter engages the work piece and an inoperative position wherein the cutter is spaced apart from the work piece, an automated air-burst device to clear away fragments of the work piece being machined, said air-burst control device comprising:

(a) an inlet pneumatically communicating with a source of compressed air;

(b) a control valve pneumatically communicating with the inlet and movable between open flow and closed flow conditions, said control valve being normally disposed in the closed flow condition for blocking air flow from the inlet through the control valve;

(c) an actuator valve pneumatically connected to the control valve and including a pressure-responsive roller for being mounted to the machining tool and aligned for engagement with the pivoted lever arm as the cutter is moved from the operative position to the inoperative position after cutting, such that upon engagement of the lever arm and roller, said actuator valve moves the control valve out of its normally closed flow condition and into the open flow condition, to release air flow from the inlet through the control valve; and (d) an air flow outlet line pneumatically communicating with the control valve and having a free end thereof aimed towards the work piece being machined to direct a burst of air flow from the inlet through the outlet line to the work piece thereby clearing away fragments of the work piece from the work piece and the machining tool.

2. An air-burst control device according to claim 1, and comprising first and second pneumatic control lines pneumatically interconnecting the actuator valve with the inlet and the control valve.

3. An air-burst control device according to claim 1, and including a flow adjuster located between the actuator valve and the control valve for adjusting the duration of air flow from the actuator valve to the control valve, and maintaining the control valve in its open condition for a predetermined time period, thereby controlling the duration of air flow from the inlet through the outlet line and to the work piece being machined.

4. An air-burst control device according to claim 1, and including an air pressure regulator located at the inlet and pneumatically communicating with said control valve for regulating the flow of air from the inlet through the control valve in its open condition.

5. An air-burst control device according to claim 1, and including at least one flexible and adjustable nozzle assembly pneumatically communicating with the free end of said outlet line to direct the outward flow of air from said outlet line towards the work piece being machined.

6. An air-burst control device according to claim 5, and including an air manifold located between the free end of the outlet line and the at least one flexible nozzle assembly for pneumatically interconnecting the outlet line and the at least one flexible nozzle assembly.

7. An air-burst control device according to claim 6, wherein said at least one flexible nozzle assembly is constructed of a plurality of removable and replaceable interconnecting segments.

8. In combination with a machining tool for machining a workpiece, and comprising a rotating cutter for machining a work piece, and a pivoted lever arm for being actuated to move the cutter between an operative position wherein the cutter engages the work piece and an inoperative position wherein the cutter is spaced apart from the work piece, an automated air-burst control device for clearing away fragments of the work piece being machined, said air-burst control device comprising:

(a) an inlet pneumatically communicating with a source of compressed air;

(b) a control valve pneumatically communicating with the inlet and movable between open flow and closed flow conditions, said control valve being normally disposed in the closed flow condition for blocking air flow from the inlet through the control valve;

(c) an actuator valve pneumatically connected to the control valve and including a pressure-responsive roller mounted to the machining tool and aligned for engagement with the pivoted lever arm as the cutter is moved from the operative position to the inoperative position after cutting, such that upon engagement of the lever arm and roller, said actuator valve moves the control valve out of its normally closed flow condition and into the open flow condition, to release air flow from the inlet through the control valve; and (d) an air flow outlet line pneumatically communicating with the control valve and having a free end thereof aimed towards the work piece being machined to direct a burst of air flow from the inlet through the outlet line to the work piece thereby clearing away fragments of the work piece from the work piece and the machining tool.

9. A combination according to claim 8, and comprising first and second pneumatic control lines pneumatically interconnecting the actuator valve with the inlet and the control valve.

10. A combination according to claim 8, and including a flow adjuster located between the actuator valve and the control valve for adjusting the duration of air flow from the actuator valve to the control valve to maintain the control valve in its open condition for a preselected time period, thereby controlling the duration of air flow from the inlet through the outlet line and to the work piece being machined.

11. A combination according to claim 8, and including an air pressure regulator located at the inlet and pneumatically communicating with said control valve for regulating the flow of air from the inlet through the control valve in its open condition.

12. A combination according to claim 8, and including at least one flexible and adjustable nozzle assembly pneumatically communicating with the free end of said outlet line to direct the outward flow of air from said outlet line towards the work piece being machined.

13. A combination according to claim 12, and including an air manifold located between the free end of the outlet line and the at least one flexible nozzle assembly for pneumatically interconnecting the outlet line and the at least one flexible nozzle assembly.

14. A combination according to claim 12, wherein said at least one flexible nozzle assembly is constructed of a plurality of removable and replaceable interconnecting segments.

* * * * *